(No Model.)
G. W. TOWAR, Jr.
PROCESS OF PURIFYING AND PRESERVING BUTTER.
No. 367,940. Patented Aug. 9, 1887.
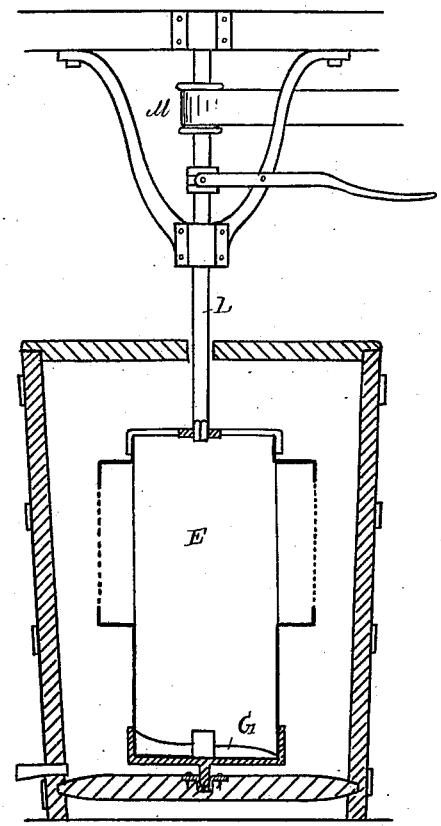
Attest:
Maria W. Towar.
Eleanor T. Cook.
Inventor:
George W. Towar Jr.

UNITED STATES PATENT OFFICE.

GEORGE W. TOWAR, JR., OF DETROIT, MICHIGAN.

PROCESS OF PURIFYING AND PRESERVING BUTTER.

SPECIFICATION forming part of Letters Patent No. 367,940, dated August 9, 1887.

Application filed April 29, 1885. Serial No. 163,906. (No model.)

*To all whom it may concern:*

Be it known that I, GEORGE W. TOWAR, Jr., of Detroit, in the county of Wayne and State of Michigan, have invented a new and useful Improvement in the Methods of Preserving and Handling Butter, which improvement is set forth in the following specification, reference being had to the accompanying drawing.

This invention relates to certain new and useful improvements in a process for the preservation of freshly-made butter and the re-manufacture of old butter, by which such old butter is renovated and made to resemble in every way that which is freshly made.

It is well known that butter does not retain its fresh flavor, no matter how well put up, for any great length of time; and one of the main objects of this invention is to so remake such butter as has lost its fresh flavor as to render it equally valuable with fresh grass-butter, while at the same time the same process applied to freshly-made butter has a tendency to preserve its flavor.

The process consists in subjecting the butter to heat until melted, and keep it at a temperature above the melting-point until all extraneous matter—like water, salt, &c.—settles to the bottom and a yeasty-looking scum rises to the top. This scum is then removed and the pure transparent melted butter decanted free from all sedimentary matter and immediately thrown onto cold ice-water to solidify and granulate. A like result of solidification and granulation may be obtained by subjecting the melted butter free from sediment and extraneous matter to a sufficiently-cold temperature, such as might be produced in a refrigerator; but my experience shows that the most preferable results are obtained by the use of ice-water, as above described. After solidification and granulation have taken place and it is desired to preserve it in this condition, the butter is packed into proper receptacles solidly, so that no vacuities are left, there being added to the butter five per cent. in weight of pure salt and one per cent. in weight of pure glycerine. The butter thus prepared is stored in a cool place until wanted for consumption. It is then again remelted, preferably in a water bath, the best temperature being about 100° Fahrenheit, and allowed to stand at that temperature, or above the melting point, until the salt and glycerine and any water therein have settled to the bottom, leaving the melted butter floating on the top. Now this melted butter is mixed with three times its volume of fresh milk, care being taken that the milk and the butter are at or about the same temperature, and the mixture is then placed in an emulsifier, the action of which, when agitated, is to produce an emulsion of the butter and milk which resembles natural cream. This artificial cream so produced is now set at a temperature of about 65° Fahrenheit, and is thenceforward treated in all respects like natural cream for the manufacture of butter.

I have shown in the accompanying drawings an emulsifier which my experience shows to be very successful in producing this artificial cream, and I will proceed to describe its construction and operation in order that my process may be the more fully and better comprehended.

No claim is made in this application to the construction of emulsifier, as the same forms the subject-matter of my application No. 238,724, filed May 13, 1887.

This emulsifier is a metal cylinder which revolves vertically in a wooden tub, as shown in vertical section in the drawing. In the lower end of this cylinder E are a pair of spiral screw-blades or elevator-screws, G, the action of which is by a rapid revolution of the cylinder to carry the fluids up to or near the top of the cylinder, where an enlargement occurs; and on the periphery of this enlarged part finely-perforated metal plates are secured, through which all the fluids have to pass. The fluids flying through the perforated metal plates as the result of the centrifugal force developed in the rapidly-revolving cylinder strike against the sides of the inclosing-tube and fall again into the fluid below, to be carried into another similar revolution, and so on until the emulsion is complete. The emulsifier revolves upon a pivot or journal properly stepped into the bottom of the tub, and at its top it is encircled by a piece of band-iron secured to such cylinder, and to this encircling band there is secured a spider having a squared hole in its center to receive the squared end of the driving-shaft L, which is provided with a pulley, M, and may be driven from any convenient source of power.

I am aware that it has been proposed to prepare butter in order that it may remain fresh and sweet for a long time by first melting it in a water bath, then skimming, and afterward quickly cooling the clear portion. I am also aware that it has been proposed to restore rancid butter either by washing the same with new milk and then cold water or by melting the butter with charcoal in a water bath and then straining the same. I make no claim to either of the above methods.

I am aware of the Patent No. 266,580, and make no claim to anything described therein as forming part of my invention.

What I claim as my invention is—

The improved method of treating butter herein described, which consists in heating the same and removing all extraneous matter while thus heated, next decanting and solidifying the pure liquid by refrigeration, next mixing therewith pure salt and glycerine, then remelting it in a water bath until the salt and glycerine are eliminated, then mixing with the melted butter fresh milk, and agitating the same, substantially as described, and for the purpose specified.

GEORGE W. TOWAR, JR.

Witnesses:
MARIA W. TOWAR,
ELEANOR T. COOK.